United States Patent
Kim et al.

(10) Patent No.: US 6,519,235 B1
(45) Date of Patent: Feb. 11, 2003

(54) MOBILE RADIO COMMUNICATION PACKET DATA NETWORK

(75) Inventors: Tae Won Kim, Kyungki-do (KR); Byung Keun Lim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,754

(22) Filed: Dec. 31, 1998

(30) Foreign Application Priority Data

Sep. 7, 1998 (KR) ............................................. 98-37254

(51) Int. Cl.[7] ................................................. H04Q 7/00
(52) U.S. Cl. ........................ 370/331; 455/445; 455/439
(58) Field of Search ................................ 370/331, 332, 370/335, 310.2, 328, 349, 352, 379, 460, 350, 399, 329, 347, 316, 389, 465; 455/435, 436, 437, 438, 439, 440, 442, 443, 444, 433, 432, 460, 426, 414, 445

(56) References Cited

U.S. PATENT DOCUMENTS

| | | | | |
|---|---|---|---|---|
| 5,793,762 A | * | 8/1998 | Penners et al. ............. | 370/389 |
| 5,978,368 A | * | 11/1999 | Hjelm et al. ................ | 370/347 |
| 6,104,929 A | * | 8/2000 | Josse et al. ................. | 455/445 |
| 6,137,783 A | * | 10/2000 | Sallberg ..................... | 370/316 |
| 6,246,876 B1 | * | 6/2001 | Hontzeas .................... | 455/436 |
| 6,249,878 B1 | * | 6/2001 | Wallentin ................... | 455/442 |
| 6,359,904 B1 | * | 3/2002 | Hamalainen et al. ....... | 370/469 |

* cited by examiner

Primary Examiner—Ricky Ngo
Assistant Examiner—Phuc Tran
(74) Attorney, Agent, or Firm—Fleshner & Kim, LLP

(57) ABSTRACT

A packet data network for providing a radio packet data service in a mobile radio communication system. The packet data network includes a plurality of radio network controllers (RNCs) for controlling a radio channel allocation to a mobile station and for controlling, matching the network, a path of a packet data service or a circuit data service; a plurality of packet data gateway nodes (PDGNs) for performing management of a mobility of the mobile station and a routing function of packet data for information management; a mobile switching center (MSC) for registering and managing terminal node identifiers of the RNCs and the PDGNs connected to the mobile switching center, and for managing and giving to the PDGNs network identification addresses which a user can directly call; and a packet router for providing a packet data transmission path by routing a packet data between the RNC and PDGN, if a mobile station requests the packet data service. If the mobile station requests the packet data service, a packet router is provided a packet transmission path in association with the RNCs, PDGNs, and MSC or another MSC.

5 Claims, 9 Drawing Sheets

MOBILE RADIO COMMUNICATION PACKET DATA NETWORK

BACKGROUND OF THE INVENTION

1. Field of the Invention

The present invention relates generally to a mobile radio communication packet data network which provides a high-speed packet data service.

2. Description of the Related Art

Generally, the second generation mobile radio communication system mainly provides a voice service. Accordingly, in case of processing packet data utilizing this system, a separate network interworking device should be provided in the mobile radio communication system.

However, the next generation mobile radio communication system is required to provide a high-speed radio packet data service. The existing packet data service does not satisfy the conditions required in the next generation mobile radio communication system since the use of resources with respect to an exchange is ineffective and it takes a lot of time to perform the call process of data and the traffic process of data.

Figure 1:
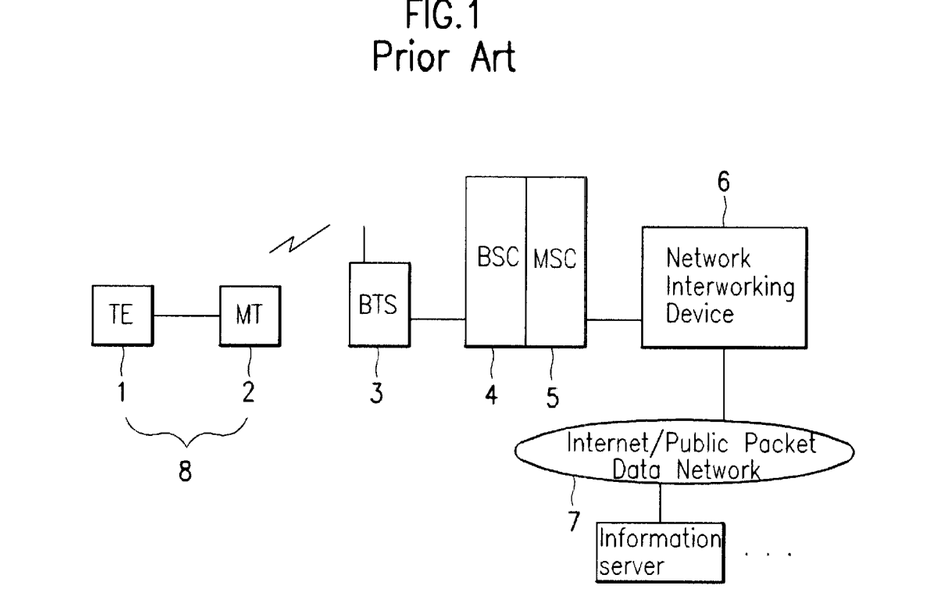
FIG. 1 is a block diagram of a conventional packet data network in a mobile radio communication network.

FIG. 1 is a block diagram of a conventional packet data network in a mobile radio communication system.

Referring to FIG. 1, in processing the packet data by the conventional mobile radio communication network, a data service is requested through a service option of a mobile station 8 wherein a terminal (TE) 1 and a mobile terminal (MT) 2 are connected together. Such a request of the data service is transferred to a mobile switching center (MSC) 5 through a base transceiver station (BTS) 3 and a base station controller (BSC) 4. The mobile switching center 5 discriminates whether a circuit data service or a packet data service is requested by analyzing the service option set by a user of the mobile station 8, and then switches circuit paths. If the mobile station 8 requests the packet data service, a network interworking device 6 controls the mobile switching center 5 to operate in association with an internet/public packet data network 7, so that the packet data service is performed.

However, since the conventional second-generation mobile radio communication system is designed to give priority to the circuit data service rather than the packet data service, the capacity and the operation of the mobile switching center will be inefficient. Further, during the packet data service, the call process of data and the traffic process of data cannot be performed at a high speed, and thus it is improper for the second-generation mobile radio communication system to be employed as the next-generation mobile radio communication system.

Accordingly, there have been continuous efforts to propose a packet data network applicable in the environment of the next-generation mobile radio communication system by improving the existing second-generation mobile radio communication system.

Specifically, researches have been continuously progressed for the packet data network applicable to the next-generation mobile radio communication system operating in the multimedia communication environment, utilizing radio network controllers (RNC) which control a radio channel allocation to the mobile station and which control, matching the network, the path of the packet data service or the circuit data service, and packet data gateway nodes (PDGN) which perform management of the mobility of the mobile station and the routing function of the packet data.

However, since the packet data network as described above has the structure in which a plurality of radio network controllers and packet data gateway nodes are connected to the existing mobile switching center, respectively, the capacity of the mobile switching center is apt to become insufficient due to the increase of load of the mobile switching center during the packet data service. Also, the call process of data and the traffic process of data cannot be achieved at a high speed, thereby not satisfying the condition of the next-generation mobile radio communication system.

SUMMARY OF THE INVENTION

Accordingly, the present invention is directed to a mobile radio communication packet data network and a method of providing a mobile radio communication packet data service that substantially obviate one or more of the problems due to limitations and disadvantages of the related art.

An object of the present invention is to provide a mobile radio communication packet data network which provides a radio packet data path by routing a packet router operating in association with radio network controllers, packet data gateway nodes when a mobile station requests the packet data service in a mobile radio communication system.

It is another object of the present invention to provide a method of providing a mobile radio communication packet data service which can process packet data at a high speed utilizing the mobile radio communication packet data network provided according to the present invention, and thus satisfy the characteristic required in a multimedia communication system.

It is still another object of the present invention to provide a method of providing a handoff during a mobile radio communication packet data service which satisfies a handoff request generated in various kinds of situations when the packet data service is performed utilizing the mobile radio communication packet data network provided according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the mobile radio communication packet data network comprises a plurality of radio network controllers (RNCs) for controlling a radio channel allocation to a mobile station and for controlling, matching the network, a path of a packet data service or a circuit data service; a plurality of packet data gateway nodes (PDGNs) for performing management of a mobility of the mobile station and a routing function of packet data for information management; a mobile switching center (MSC) for registering and managing terminal node identifiers of the RNCs and the PDGNs connected to the mobile switching center, and for managing and giving to the PDGNs network identification addresses which a user can directly call; and a packet router for providing a packet data transmission path by routing a packet data between the RNC and PDGN, if a mobile station requests the packet data service; wherein if the mobile station requests the packet data service, a packet router is provided a packet transmission path in association with the RNCs, PDGNs, and MSC or another MSC.

In another aspect of the present invention, there is provided a method of providing a mobile radio communication packet data service, comprising the steps of a mobile station transmitting a packet data call to a terminating terminal node; setting signal link between the mobile station and a RNC; setting a point-to-point protocol (PPP) link between the mobile station and the terminating terminal node; and transmitting a packet data between the mobile station and the PDGN utilizing the PPP link.

In still another object of the present invention, there is provided a method of providing a handoff during a mobile radio communication packet data service including a plurality of radio network controllers (RNCs), a plurality of packet data gateway nodes (PDGNs), and at least one mobile switching center (MSC), the handoff providing method comprising the steps of: instructing a handoff to the PDGN utilizing a network identification address of a previous RNC if a certain mobile station moves into a region of a new RNC in a state that a point-to-point protocol (PPP) link set between the mobile station and the PDGN is in an active state; the new RNC informing to the PDGN a network identification address of the new RNC and the terminal node identifier; and transmitting the packet data utilizing the packet router between the new RNC and the PDGN.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
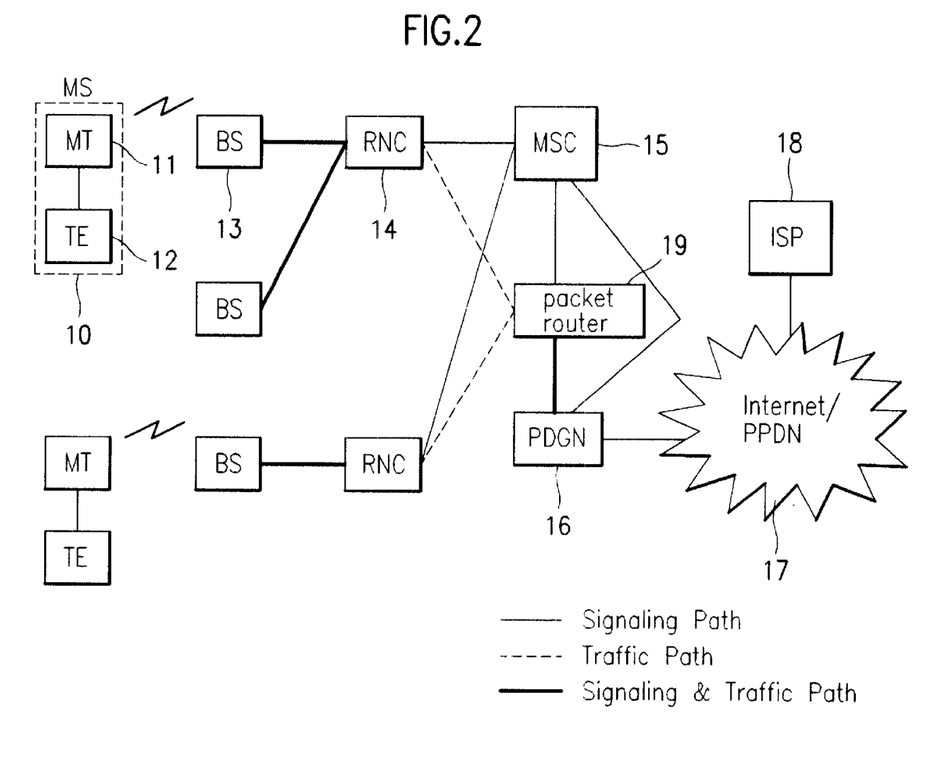
FIG. 2 is a block diagram of the packet data network according to the present invention.

FIG. 2 is a block diagram of the mobile radio communication packet data network according to the present invention.

Referring to FIG. 2, the packet data network according to the present invention includes a mobile station (MS) 10, composed of a mobile terminal (MT) 11 and a data terminal (TE) 12, for performing data transmission/reception with respect to an Internet/public packet data network (PPDN) 17 as a packet data or circuit data service option, a base station (BS) 13 for connecting a radio channel to the mobile station 10, a radio network controller (RNC) 14 for controlling a radio channel allocation to the mobile station 10 and for controlling, matching the network, a path of a packet data service or a circuit data service, a packet data gateway node (PDGN) 16 for performing management of a mobility of the mobile station 10 and a routing function of packet data for information management, a mobile switching center (MSC) 15 for registering and managing terminal node identifiers of the RNC 14 and the PDGN 16 connected to the mobile switching center, and for managing and giving to the PDGN 16 network identification addresses which a user can directly call, a packet router 19 for providing a packet data transmission path by routing a packet data between RNC 14 PDGN 16, if a mobile station 10 requests the packet data service.

The packet data network according to the present invention may additionally include a home location register (HLR) and a visitor location register (VLR) for managing location information of the mobile station 10. And, to the Internet/PPDN 17 is connected an Internet service provider (ISP).

The packet data network according to the present invention as constructed above manages the call control and data transmission paths using a signaling link, and transmits user packet data using a data link. At this time, the signaling link is determined by a protocol stack of each node for setting up the signal link. The data link is multiplexed/demultiplexed on signaling link between the radio network controller 14 and the packet data gateway node 16 using the frame identifier. The packet data is transmitted after the signaling link is set.

Figure 3A:
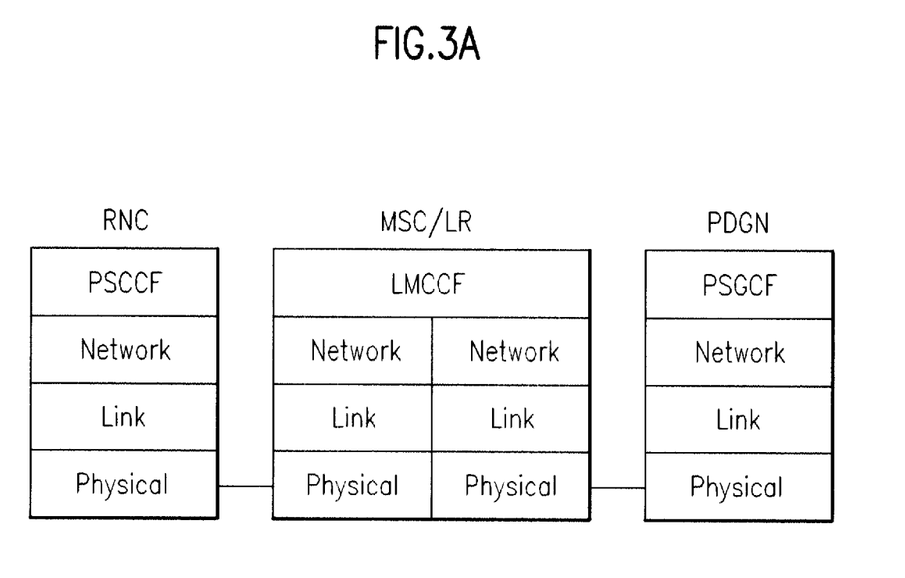
FIG. 3a is a view illustrating the structure of the stack of the signaling protocol of the packet data network according to the present invention.
Figure 3B:
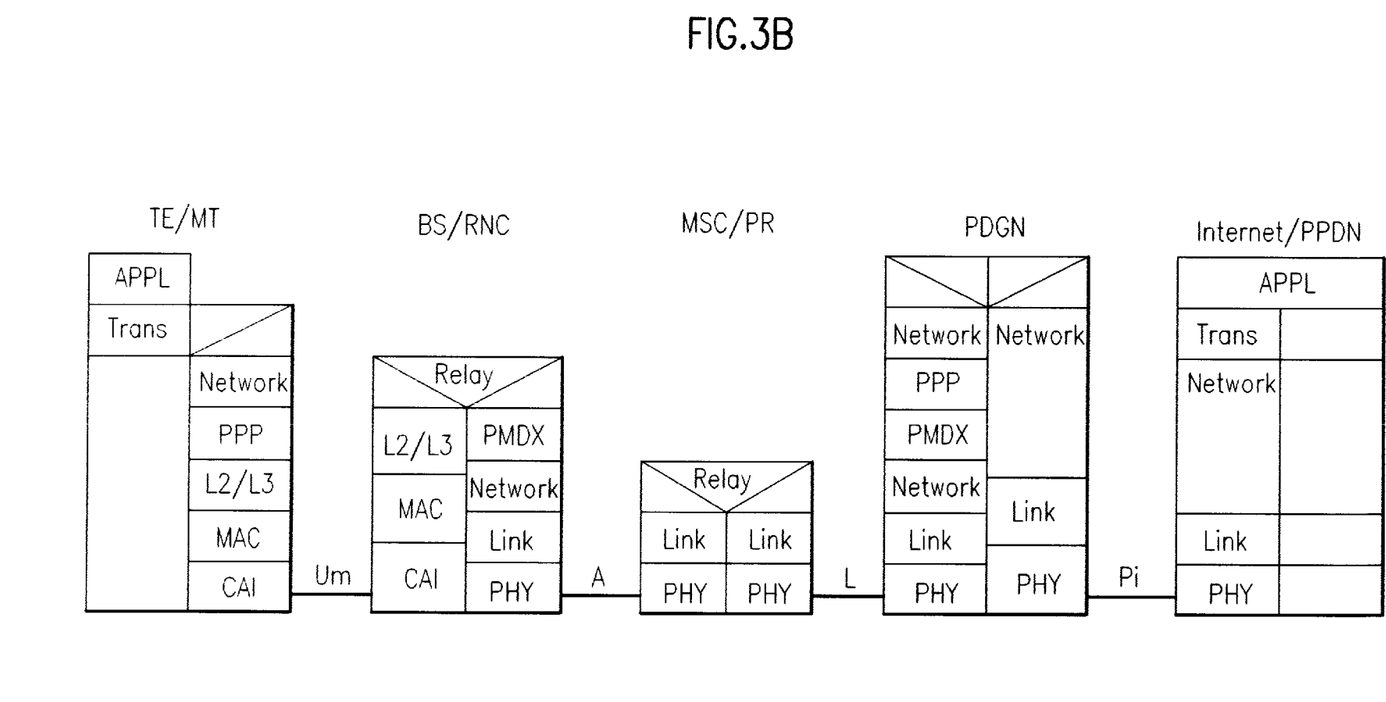
FIG. 3b is a view illustrating the stack of the data transmission protocol of the packet data network according to the present invention.

FIG. 3a is a view illustrating the structure of the stack of the signaling protocol of the packet data network based according to the present invention, and FIG. 3b is a view illustrating the stack of the data transmission protocol of the packet data network according to the present invention.

As shown in FIG. 3a, in order to form the signal link, the RNC provides a function of interfacing the protocol for an wireless packet service on the upper layer to the mobile station, controlling the handoff, and managing routing for a packet data of the mobile station, i.e., packet service call control function (PSCCF).

The mobile switching center manages location information and routing information for the mobile station on the upper layer, and providing each terminal node identifier (TNID) and the location information for the mobile station to the RNC or PDGN, i.e., location management and packet call control function (LMCCF).

The PDGN manages location information for the mobile station on the upper layer, registration information for an unique IP and a mobile IP, i.e., packet data service gateway control function (PSGCF).

As shown in FIG. 3b, in order to form the data link between the radio network controller 14 and the packet data gateway node 16, a packet multiplexed/demultiplexed layer is put on the upper layer of the network layer, and the PPP frame data of the mobile station 10 is connected to the packet router connected to a target terminal node.

Accordingly, the packet data frame is transmitted to the RNC and the packet router, and the packet router and PDGN using the packet data transmission path without using the mobile switching center which performs the circuit switching operation and thereby enabling the advanced packet data network according to the present invention.

Figure 4:
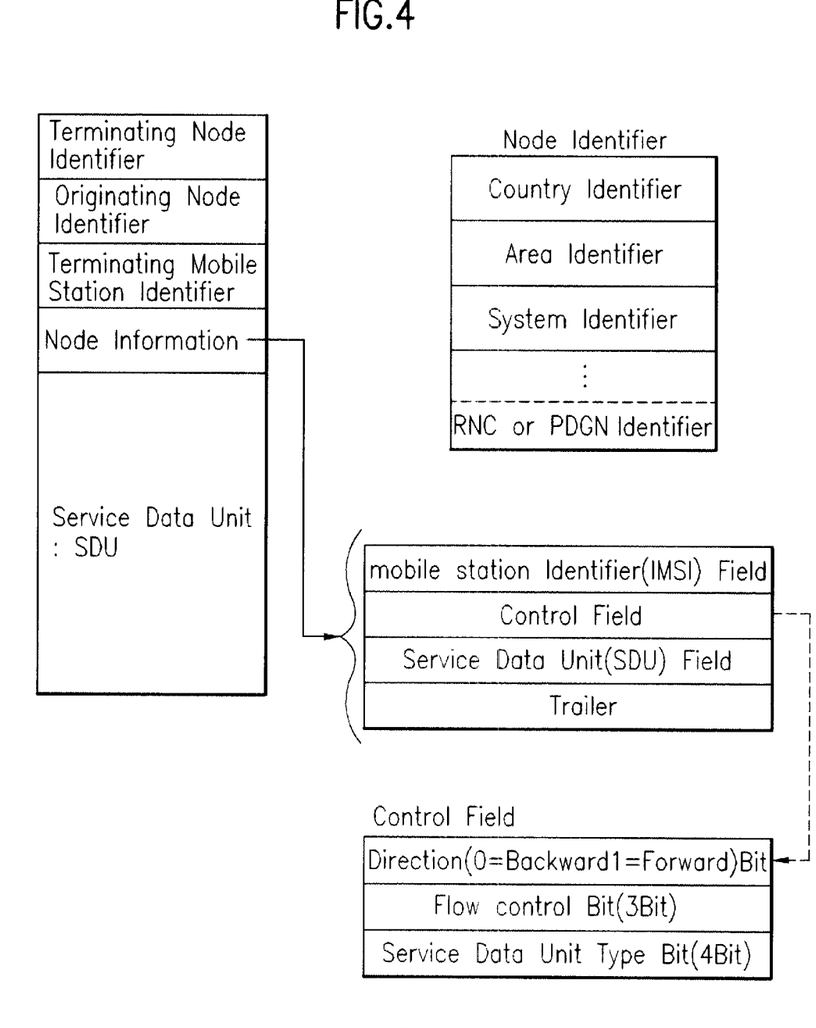
FIG. 4 is a view illustrating the INNP for packet data service according to the present invention.

FIG. 4 is a view illustrating the INNP for packet data service according to the present invention.

Referring to FIG. 4, the inter node network protocol (INNP) is used to classified each call packet when a lots of packet data call is predetermined between the same RNC and PDGN while the packet data is transmitted between the RNC and PDGN via the packet router.

The data frame of the inter node network protocol (INNP) includes a terminating node identifier, an originating node identifier, a terminating mobile station identifier, a node information, a service data unit fields.

Here, the node information includes a mobile station identifier field, control field, and service data unit field, and the control field includes a direction bit, flow control bits, and service data unit type bits.

Also, the node identifier comprises a country identifier, an area identifier, a system identifier, an identifier for the RNC or PDGN. Accordingly, this node identifier enables that the network data can be transmitted to terminating terminal in the global roaming because the RNC or PDGN has own identifier in the next generation communication system.

Figure 5:
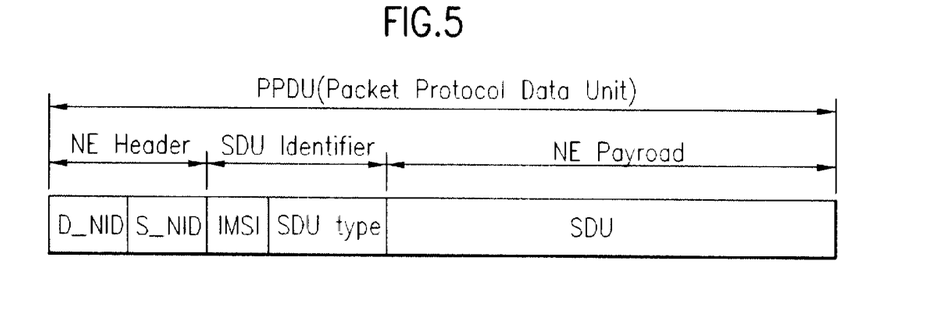
FIG. 5 is a view illustrating the structure of the PPDU of INNP for packet data network according to the present invention.

FIG. 5 is a view illustrating the structure of the PPDU of INNP for packet data network according to the present invention.

Referring to FIG. 5, the PPDU of INNP is composed of a network entity having a destination node identifier (D_NID), send node identifier (S_NID), SDU identifier having IMSI and SDU type fields, and network entity as a SDU field.

According to FIG. 5, a method of providing a mobile radio communication packet data service, includes the steps of a mobile station transmitting a packet data call to a terminating terminal node, setting signal link between the mobile station and a RNC, setting a point-to-point protocol (PPP) link between the mobile station and the terminating terminal node, and transmitting a packet data between the mobile station and the PDGN utilizing the PPP link.

In the signaling link setting step, the mobile station is originated the packet data call, the RNC request call type of the packet call to the mobile switching center and the mobile switching center identifies routing information and informs packet call request of the mobile station to the PDGN. At this time, the signal link is not set on the packet router. That is, the signal link is set among the RNC, the MSC, and the PDGN, the packet router acts a router as an element of data link between the RNC and the PDGN. In FIG. 2, the signaling path between the MSC and the packet router is used maintain and repair operation and maintain and repair operation for resource information.

And, the user frame data is transmitted to the corresponding signal link to set the data link. In case, since the user data frame have own identifier in each frame header, the PDGN identify the user frame header differing to the mobile station's IP option and drives PPP entity and PPP entity of the PDGN, thereby setting the PPP link to the data transmission path of the upper layer is completely provided. If the PDGN is received an user data frame having new identifier, the PDGN is regarded as a new requirement for the call connection.

Such as the above explain, the signal link and data link are set and the packet data is transmitted between the mobile station and Internet/PPDN. In case, the PDGN provides a connection point to the Internet/PPDN.

The operation of the packet data network according to the present invention when a handoff is generated will now be explained with reference to FIGS. 6a to 6e.

Figure 6A:
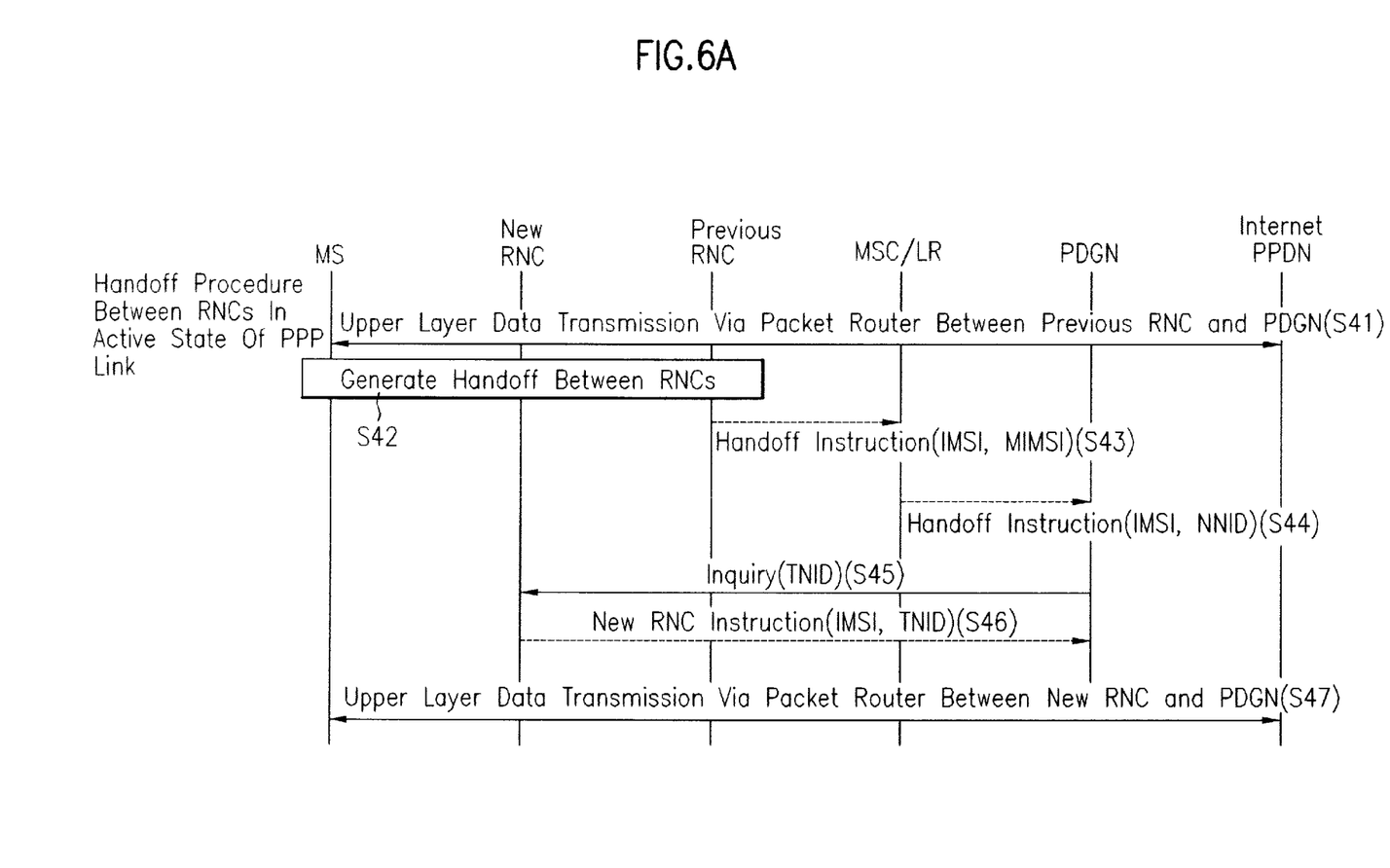
FIGS. 6a to 6e are flowcharts illustrating the handoff procedures in various states of packet data transmission according to the present invention.

First, referring to FIG. 6a, if the PPP link set between the mobile station and the PDGN is in the active state, i.e., if a certain mobile station moves into the region of a new RNC and a handoff is generated (S42) in a state that the upper layer data is transmitted using the packet router (S41), the previous RNC instructs the MSC/LR a handoff utilizing the network identification addresses IMSI and MIMSI of the previous RNC (S43). Then, the mobile switching center MSC/LR instructs the PDGN a handoff utilizing IMSI and a network node identifier (NNID) (S44). The PDGN inquiry for performing the handoff utilizing TNID to the new RNC (S45). The new RNC informs the PDGN of the network identification address IMSI of the new RNC and the terminal node identifier TNID (S46). Accordingly, the upper layer packet data is transmitted using the packet router between the new RNC and the PDGN (S47).

Second, the operation of the packet data network, if a certain mobile station moves into the region of the new mobile switching center MSC/LR in a state that the PPP link set between the mobile station and the PDGN is in the active state, is similar to that in the state that the PPP link set between the mobile station and the PDGN is in the active state as shown in FIG. 6a. That is, the previous RNC instructs the PDGN a handoff utilizing the network it identification addresses such as a IMSI or MIMSI. The new mobile switching center informs to the PDGN for the network identification addresses and the terminal node identifier of the new mobile switching center. Accordingly, the packet data is transmitted using the packet router between the packet router of the new mobile switching center and the PDGN.

Figure 6B:
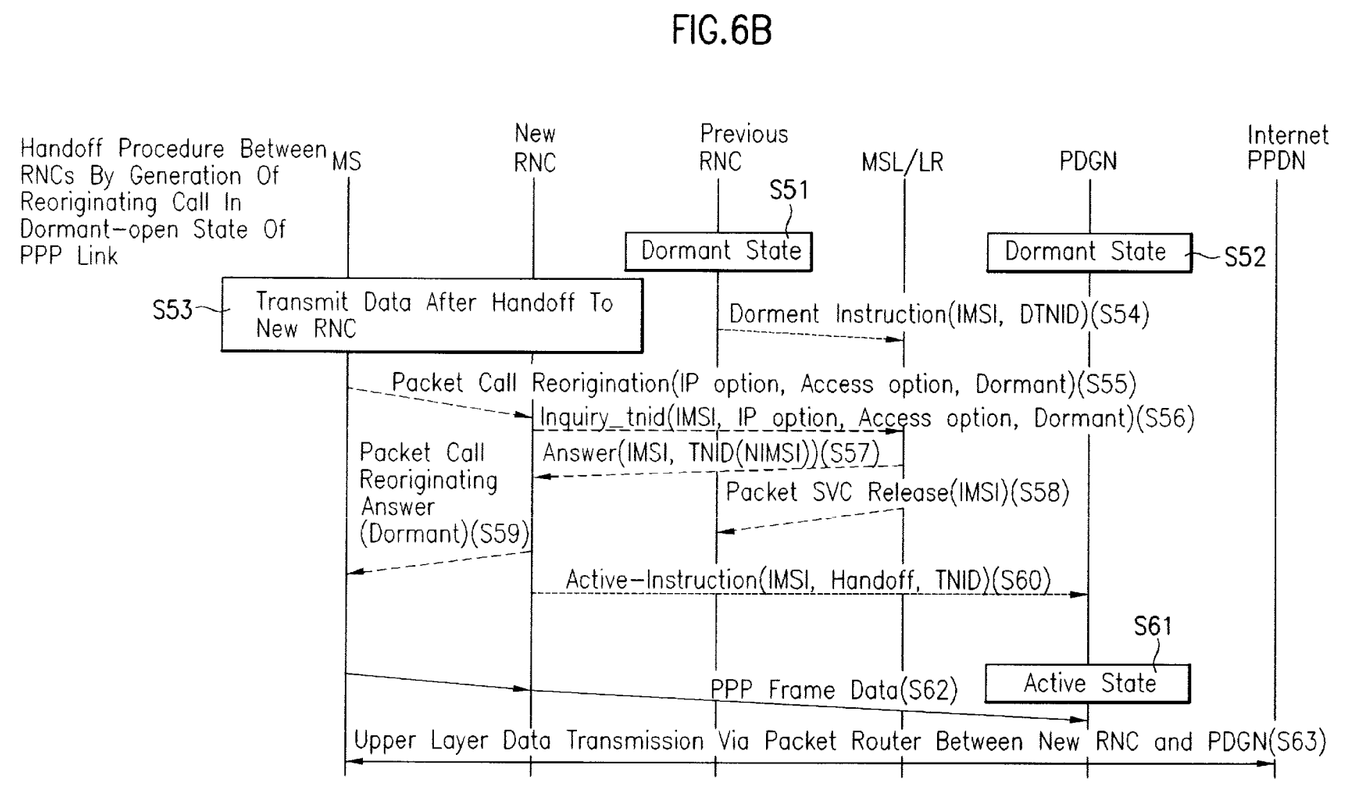

Third, as shown in FIG. 6b, in a state that the RNC and the PDGN are in a dormant-open state, respectively (S51 and S52), the previous RNC instructs the previous mobile switching center MSC/LR of the dormant-open state utilizing the dormant mobile station identifier and the terminal node identifiers IMSI and DTNID (S54). At this time, if a certain mobile station, after moving into the new RNC, transmits a re-originating call to the new RNC utilizing the IP option, access option, and dormant state information (S55), the mobile station release a packet traffic channel of the previous RNC and should transmit the packet data after handoff is performed to the new RNC (S53). Accordingly, the new RNC inquires of the mobile switching center about the terminating terminal node identifier of the PDGN utilizing the IP option, access option, and dormant state information (S56), and the mobile switching center answers to the new RNC (S57). Also, the mobile switching center requests the previous RNC to release the packet SVC (S58). Accordingly, the new RNC transmits to the mobile station an answer signal for permitting the packet data transmission (S59), and instructs the PDGN to change the present state to the active state utilizing the mobile station identifier IMSI, terminal node identifier TNID, and handoff information (S60). Accordingly, the PDGN becomes active (S61), the PPP link is set between the mobile station and the PDGN, and thus the PPP frame data is transmitted (S62). The re-originating mobile station transmits the upper layer packet data to the PDGN using the packet router (S63).

Figure 6C:
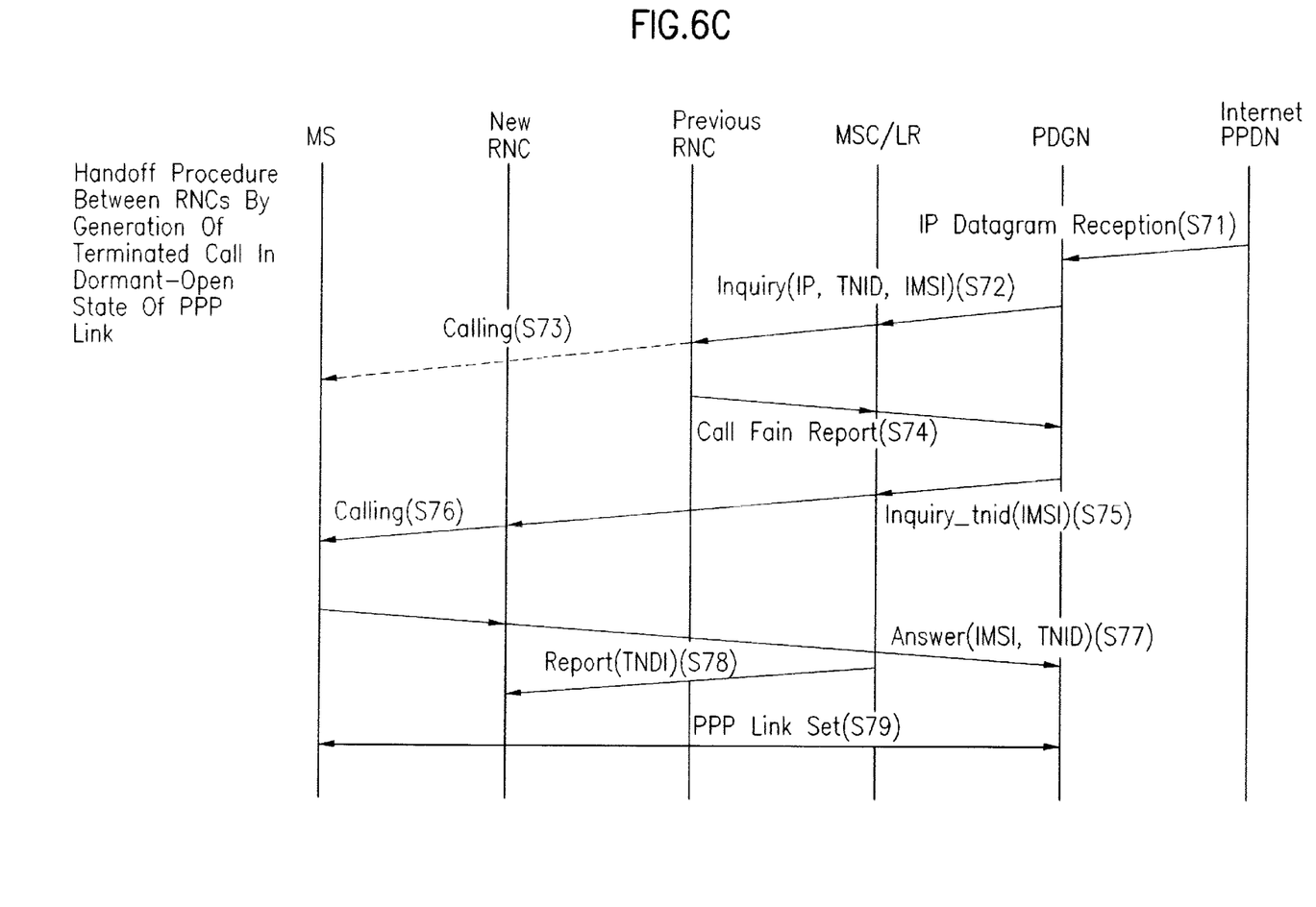

Fourth, as shown in FIG. 6c, if the IP datagram is received to the PDGN in a state that the PPP link set between the mobile station and the PDGN is in the dormant-open state, and a certain mobile station has moved into a new RNC (S71), the PDGN inquires of the previous RNC through the mobile switching center about the moving IP, mobile station identifier IMSI, and terminal node identifier TNID of the terminating mobile station (S72), and the previous RNC calls the mobile station (S73). If the previous RNC reports the call failure of the mobile station to the PDGN through the mobile switching center (S74), the PDGN inquires of the mobile switching center about the terminal node identifier of the new RNC (S75). Accordingly, the new RNC calls the terminating mobile station (S76), and the terminating mobile station informs the PDGN of an answer message through the new RNC and mobile switching center (S77). Also, the mobile switching center reports the terminal node identifier TNID of the PDGN to the new RNC (S78). Accordingly, the PPP link is set between the PDGN and the terminating mobile station using the packet router, and thus the upper layer packet data is transmitted (S79).

Figure 6D:
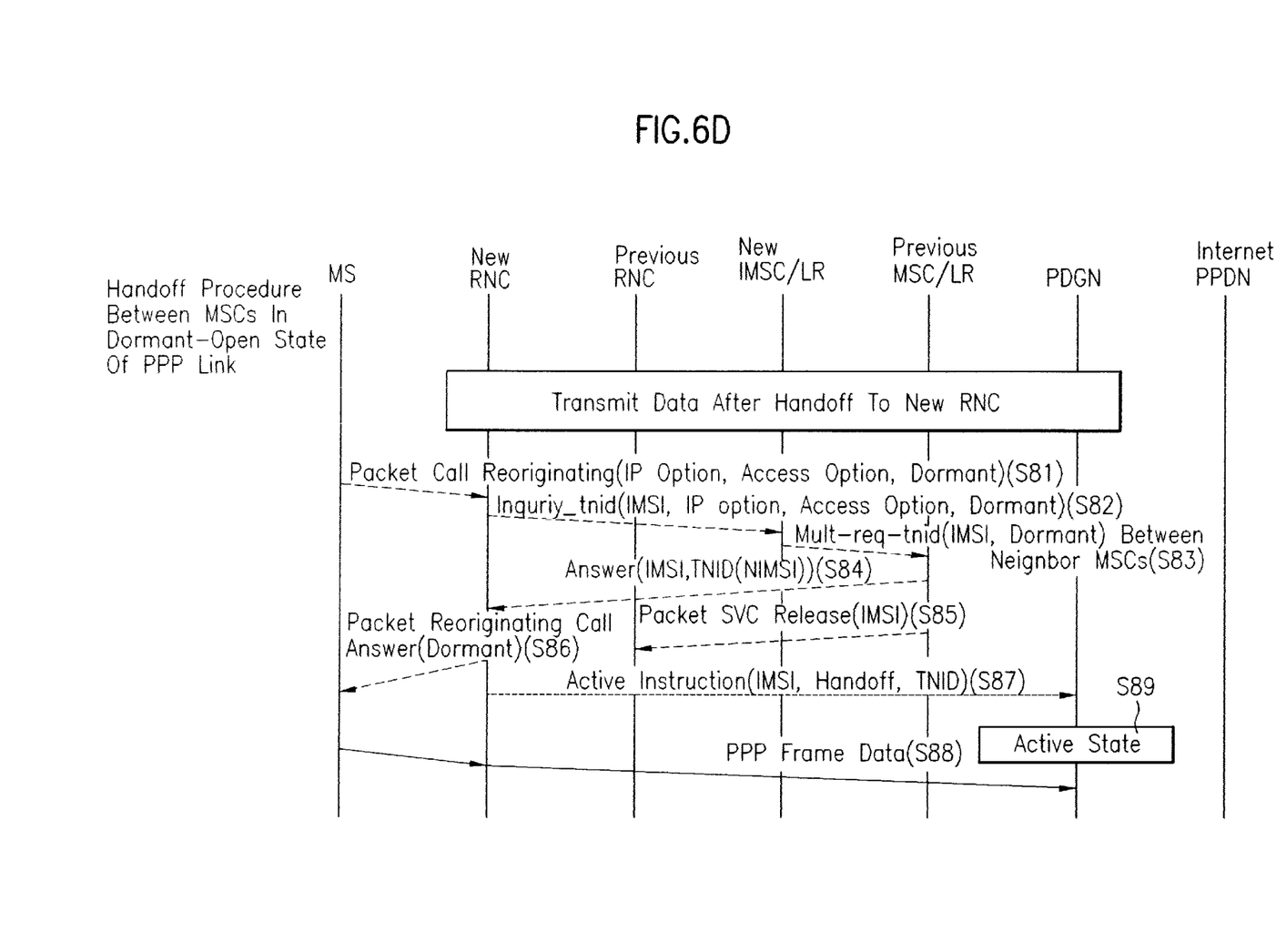

Fifth, as shown in FIG. 6d, if the mobile station transmits a re-originating call to a new RNC in a state that the PPP link set between the mobile station and the PDGN is in the dormant-open state, and a certain mobile station has moved into a new mobile switching center (S81), the new RNC requests the terminal node identifier of the PDGN to the new mobile switching center utilizing the IP option, access option, and dormant state information (S82). The new mobile switching center transfers the request of the new RNC to the previous mobile switching center (S83). Accordingly, the previous mobile switching center answers the new RNC that its present state is the dormant-open state (S84), and requests the previous RNC to release the packet switching virtual circuit (SVC) (S85). Thereafter, the new RNC answers the packet re-originating request of the mobile station (S86), and the previous RNC instructs the new RNC to change the present state to the active state (S87). Accordingly, the PDGN becomes active (S89), the PPP link is set between the terminating mobile station and the PDGN, and thus the PPP frame data is transmitted through the packet router (S88).

Figure 6E:
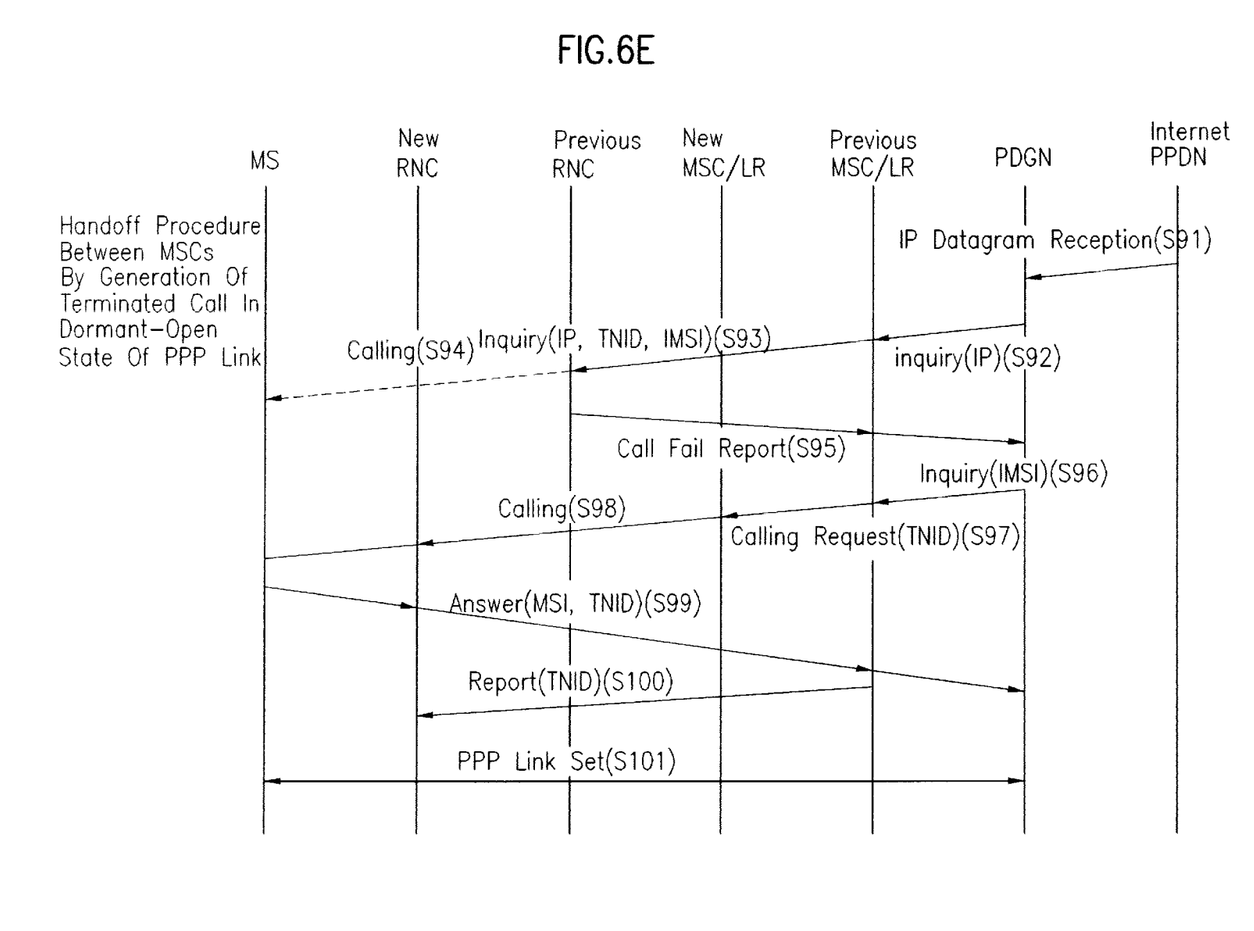

Sixth, as shown in FIG. 6e, if the IP datagram is received again to the PDGN in a state that the PPP link set between the mobile station and the PDGN is in the dormant-open state, and a certain mobile station has moved to a new mobile switching center, the PDGN inquires of the previous RNC through the previous mobile switching center about the terminating mobile station utilizing the mobile station identifier and the terminal node identifiers IMSI and TNID (S92, S93). And, the previous RNC calls the mobile station (S94). The previous RNC, if the call of the terminating mobile station fails, informs the PDGN of the call failure through the previous mobile switching center (S95). Then the PDGN inquires of the previous mobile switching center about the terminal node identifier TNID of the new RNC (S96). The previous mobile switching center inquires of the new mobile switching center and identifies the terminal node identifier TNID (S97). Thereafter, the new mobile switching center calls the terminating mobile station through the new RNC (S98). Accordingly, the new RNC can call the terminating mobile station, and thus the terminating mobile station informs the PDGN of an answer message through the new RNC, the new mobile switching center, and the previous mobile switching center (S99). Also, the new mobile switching center reports the terminal node identifier TNID of the PDGN to the new RNC (S100).

Accordingly, the PPP link is set between the PDGN and the terminating mobile station using the packet router, and thus the upper layer packet data is transmitted (S101).

As described above, the present invention can implement the mobile radio communication packet data network which can provide a high-speed packet data communication in the multimedia communication environment utilizing the existing second-generation mobile radio communication system. Also, the present invention can easily implement a radio intra-net suitable for enterprises, and can provide an environment for providing diverse services by giving specified IPs to the subscribers.

Further, the present invention provides a method of providing a mobile radio communication packet data service which can process packet data at a high speed utilizing the mobile radio communication packet data network provided according to the present invention, thereby satisfying the characteristic required in the multimedia communication system.

Furthermore, the present invention provides a method of providing a handoff during a mobile radio communication packet data service which can satisfy a handoff request generated in various kinds of situations when the packet data service is performed utilizing the mobile radio communication packet data network provided according to the present invention.

While the present invention has been described and illustrated with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of providing a handoff during a mobile radio communication packet data service including a plurality of radio network controllers(RNCs), a plurality of packet data gateway nodes (PDGNs), and at least one mobile switching center (MSC), the handoff providing method comprising the steps of:

instructing a handoff to the PDGN through the mobile switching center utilizing a network identification address of a previous RNC if a certain mobile station moves into a region of a new RNC in a state that a point-to-point protocol (PPP) link set between the mobile station and the PDGN is in an active state;

the PDGN inquiry for performing the handoff utilizing terminal node identifiers (TNIDs) to a new RNC;

the new RNC informing to the PDGN a network identification address of the new RNC and the terminal node identifier;

transmitting the packet data utilizing the packet router between the new RNC and the PDGN;

the previous RNC instructing the PDGN a handoff utilizing the network identification address of the mobile switching center if a certain mobile station moves into a region of a new mobile switching center in a state that the PPP link set between the mobile station and the PDGN is in the active state;

the new mobile switching center informing the PDGN of the network identification address of the new mobile switching center; and transmitting the packet data using the packet router between the new mobile switching center and the PDGN.

2. A method of providing a handoff during a mobile radio communication packet data service including a plurality of radio network controllers (RNCs), a plurality of packet data gateway nodes (PDGNs), and at least one mobile switching center (MSC), the handoff providing method comprising the steps of:

instructing a handoff to the PDGN through the mobile switching center utilizing a network identification address of a previous RNC if a certain mobile station moves into a region of a new RNC in a state that a point-to-point protocol (PPP) link set between the mobile station and the PDGN is in an active state;

the PDGN inquiry for performing the handoff utilizing terminal node identifiers (TNIDs) to a new RNC;

the new RNC informing to the PDGN a network identification address of the new RNC and the terminal node identifier;

transmitting the packet data utilizing the packet router between the new RNC and the PDGN;

a new RNC inquiring of the mobile switching center about the terminating terminal node identifier of the PDGN, and identifying the terminating terminal node identifier if a re-originating call is generated in a state that the PPP link set between the mobile station and the PDGN is in a dormant-open state and a certain mobile station moved into the new RNC;

the mobile switching center requesting the previous RNC to release a packet switching virtual circuit (SVC);

the new RNC instructing the PDGN to change the present state to an active state; and transmitting the packet data from the originating mobile station to the PDGN using the packet router.

3. A method of providing a handoff during a mobile radio communication packet data service including a plurality of radio network controllers (RNCs), a plurality of packet data gateway nodes (PDGNs), and at least one mobile switching center (MSC), the handoff providing method comprising the steps of:

instructing a handoff to the PDGN through the mobile switching center utilizing a network identification address of a previous RNC if a certain mobile station moves into a region of a new RNC in a state that a point-to-point protocol (PPP) link set between the mobile station and the PDGN is in an active state;

the PDGN inquiry for performing the handoff utilizing terminal node identifiers (TNIDs) to a new RNC;

the new RNC informing to the PDGN a network identification address of the new RNC and the terminal node identifier;

transmitting the packet data utilizing the packet router between the new RNC and the PDGN;

the PDGN which received a terminating call calling the previous RNC through the mobile switching center if the terminating call is generated in a state that the PPP link set between the mobile station and the PDGN is in a dormant-open state and a certain mobile station has moved into a new RNC;

the previous RNC, if the call of the terminating mobile station fails, informing the call failure to the PDGN through the mobile switching center;

the PDGN inquiring of the mobile switching center about the terminal node identifier of the new RNC, and calling the terminating mobile station through the new RNC;

the terminating mobile station informing an answer message to the PDGN through the new RNC and mobile switching center; and transmitting the packet data from the PDGN to the terminating mobile station using the packet router.

4. A method of providing a handoff during a mobile radio communication packet data service including a plurality of radio network controllers (RNCs), a plurality of packet data gateway nodes (PDGNs), and at least one mobile switching center (MSC), the handoff providing method comprising the steps of:

instructing a handoff to the PDGN through the mobile switching center utilizing a network identification address of a previous RNC if a certain mobile station moves into a region of a new RNC in a state that a point-to-point protocol (PPP) link set between the mobile station and the PDGN is in an active state;

the PDGN inquiry for performing the handoff utilizing terminal node identifiers (TNIDs) to a new RNC;

the new RNC informing to the PDGN a network identification address of the new RNC and the terminal node identifier;

transmitting the packet data utilizing the packet router between the new RNC and the PDGN;

a new RNC requesting the terminal node identifier of the PDGN to a new mobile switching center if an originating call is generated in a state that the PPP link set between the mobile station and the PDGN is in a dormant-open state and a certain mobile station has moved into the new mobile switching center;

the previous mobile switching center answering the new RNC that its present state is the dormant-open state, and requesting the previous RNC to release a packet switching virtual circuit (SVC);

the new RNC instructing the PDGN to change the present state to an active state; and transmitting the packet data from the originating mobile station to the PDGN using the packet router.

5. A method of providing a handoff during a mobile radio communication packet data service including a plurality of radio network controllers (RNCs), a plurality of packet data gateway nodes (PDGNs), and at least one mobile switching center (MSC), the handoff providing method comprising the steps of:

instructing a handoff to the PDGN through the mobile switching center utilizing a network identification address of a previous RNC if a certain mobile station moves into a region of a new RNC in a state that a point-to-point protocol (PPP) link set between the mobile station and the PDGN is in an active state;

the PDGN inquiry for performing the handoff utilizing terminal node identifiers (TNIDs) to a new RNC;

the new RNC informing to the PDGN a network identification address of the new RNC and the terminal node identifier;

transmitting the packet data utilizing the packet router between the new RNC and the PDGN;

the PDGN calling the RNC through the previous mobile switching center if the packet data is received again in a state that the PPP link set between the mobile station and the PDGN is in a dormant-open state and a certain mobile station has moved into a new mobile switching center;

the RNC, if the call of the terminating mobile station fails, informing the call failure to the previous mobile switching center;

the previous mobile switching center finding the RNC through the new mobile switching center, and calling the terminating mobile station through the RNC;

the terminating mobile station informing an answer message to the PDGN through the RNC and the new mobile switching center; and transmitting the packet data from the PDGN to the terminating mobile station using the packet router.

* * * * *